(12) United States Patent
Cobb et al.

(10) Patent No.: US 8,218,818 B2
(45) Date of Patent: Jul. 10, 2012

(54) FOREGROUND OBJECT TRACKING

(75) Inventors: Wesley Kenneth Cobb, The Woodlands, TX (US); Ming-Jung Seow, Houston, TX (US); Tao Yang, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 500 days.

(21) Appl. No.: 12/552,197

(22) Filed: Sep. 1, 2009

(65) Prior Publication Data

US 2011/0052002 A1    Mar. 3, 2011

(51) Int. Cl.
*G06K 9/00* (2006.01)
(52) U.S. Cl. .......................... 382/103; 382/169
(58) Field of Classification Search .................. 382/100, 382/103, 106, 107, 155, 162, 168, 173, 181, 382/193, 199, 209, 218, 219, 224, 232, 254, 382/274, 276, 282, 286–294, 305, 312; 707/791; 340/573.1, 948
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,162,055 B2 * | 1/2007 | Gu et al. ....................... 382/103 |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |

(Continued)

FOREIGN PATENT DOCUMENTS

WO    2009049314 A2    4/2009

OTHER PUBLICATIONS

International Search Report and Written Opinion for PCT Application Serial No. PCT/US2010/045197 dated Feb. 28, 2011.

(Continued)

*Primary Examiner* — Vikkram Bali
*Assistant Examiner* — Nancy Bitar
(74) *Attorney, Agent, or Firm* — Patterson & Sheridan, LLP

(57) ABSTRACT

Techniques are disclosed for detecting foreground objects in a scene captured by a surveillance system and tracking the detected foreground objects from frame to frame in real time. A motion flow field is used to validate foreground objects(s) that are extracted from the background model of a scene. Spurious foreground objects are filtered before the foreground objects are provided to the tracking stage. The motion flow field is also used by the tracking stage to improve the performance of the tracking as needed for real time surveillance applications.

20 Claims, 12 Drawing Sheets

U.S. PATENT DOCUMENTS

| | | | |
|---|---|---|---|
| 7,868,912 | B2 | 1/2011 | Venetianer et al. |
| 2002/0030739 | A1* | 3/2002 | Nagaya et al. ............... 348/143 |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0165386 | A1 | 7/2006 | Garoutte |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0181453 | A1* | 7/2008 | Xu et al. ...................... 382/103 |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1* | 8/2009 | Armstrong et al. ............. 706/13 |
| 2009/0297023 | A1 | 12/2009 | Lipton et al. |
| 2009/0324107 | A1 | 12/2009 | Walch |
| 2010/0063949 | A1 | 3/2010 | Eaton et al. |
| 2011/0044536 | A1* | 2/2011 | Cobb et al. ................... 382/165 |
| 2011/0052003 | A1* | 3/2011 | Cobb et al. ................... 382/103 |

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

\* cited by examiner

FOREGROUND OBJECT TRACKING

BACKGROUND OF THE INVENTION

1. Field of the Invention

Embodiments of the invention provide techniques for computationally analyzing a sequence of video frames. More specifically, embodiments of the invention relate to techniques for tracking a foreground object in a scene depicted in the sequence of video frames.

2. Description of the Related Art

Some currently available video surveillance systems provide simple object recognition capabilities. For example, a video surveillance system may be configured to classify a group of pixels (referred to as a "foreground object") in a given frame as being a particular object (e.g., a person or vehicle). Once identified, a foreground object may be tracked from frame-to-frame in order to follow the foreground object moving through the scene over time, e.g., a person walking across the field of vision of a video surveillance camera.

However, such surveillance systems typically rely on a background model to extract foreground object(s) from the scene. The foreground object(s) that are extracted from the background model may be spurious and/or unreliable depending on characteristics of the camera or the particular environment. Tracking spurious foreground object(s) is undesirable. To further complicate things, the background model may return fragmented foreground objects in a very complex environment, presenting an additional challenge to the tracker. In order to for any surveillance system to identify objects, events, behaviors, or patterns as being "normal" or "abnormal" the foreground objects should be correctly detected and tracked. Accordingly, what is needed is accurate foreground object detection and tracking that produces reliable results in real-time.

SUMMARY OF THE INVENTION

Embodiments of the invention relate to techniques for tracking a detected foreground patch that depicts a foreground object in a sequence of video frames captured by a video camera or other recorded video. One embodiment includes a computer-implemented method for tracking a foreground patch depicting a foreground in a sequence of video frames captured by a video camera. The method itself may generally include receiving a video frame and detecting a foreground patch that depicts a foreground object in the video frame to produce a detected first foreground patch. A motion flow field is received for the video frame that includes an angle and magnitude value for the first detected foreground patch in the video frame relative to the first detected foreground patch in a previous video frame. The first detected foreground patch is categorized as being associated with an existing tracked foreground patch or as a discovered foreground patch based on a combination of the motion flow field and features of the first detected foreground patch. Tracking data that is used to track the foreground object in the sequence of video frames is updated.

Another embodiment of the invention includes a computer-readable storage medium containing a program, which when executed on a processor, performs an operation for tracking a detected foreground patch that depicts a foreground object in a sequence of video frames captured by a video camera. The operation itself may generally include receiving a video frame and detecting a foreground patch that depicts a foreground object in the video frame to produce a detected first foreground patch. A motion flow field is received for the video frame that includes an angle and magnitude value for the first detected foreground patch in the video frame relative to the first detected foreground patch in a previous video frame. The first detected foreground patch is categorized as being associated with an existing tracked foreground patch or as a discovered foreground patch based on a combination of the motion flow field and features of the first detected foreground patch. Tracking data that is used to track the foreground object in the sequence of video frames is updated.

Still another embodiment of the invention provides a system. The system itself may generally include a video input source configured to provide a sequence of video frames, each depicting a scene, a processor and a memory containing a program, which, when executed on the processor is configured to perform an operation for tracking a detected foreground patch that depicts a foreground object in a sequence of video frames captured by a video camera. The processor is configured to receive a video frame and detect a foreground patch that depicts a foreground object in the video frame to produce a detected first foreground patch. A motion flow field is received for the video frame that includes an angle and magnitude value for the first detected foreground patch in the video frame relative to the first detected foreground patch in a previous video frame. The first detected foreground patch is categorized as being associated with an existing tracked foreground patch or as a discovered foreground patch based on a combination of the motion flow field and features of the first detected foreground patch. Tracking data that is used to track the foreground object in the sequence of video frames is updated.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
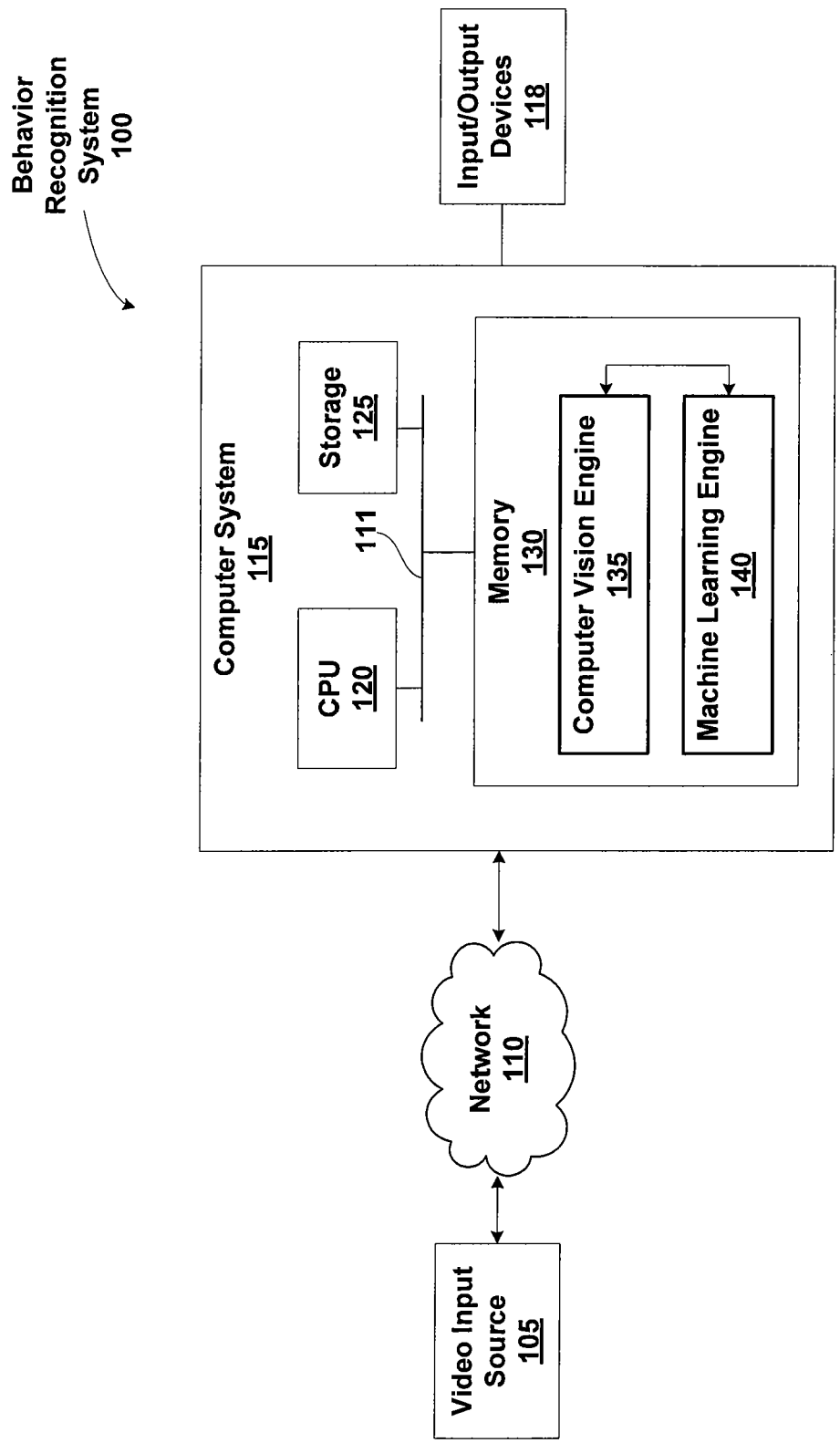
FIG. 1 illustrates components of a video analysis system, according to one embodiment of the invention.

Embodiments of the invention provide techniques for generating a background model for a complex and/or dynamic scene over a period of observations without supervision. The approaches described herein allow a background model generated by a computer vision engine to adapt to recognize different background states observed in the scene over time. Thus, the computer vision engine may more accurately distinguish between novel objects (foreground) present in the scene and elements of scene background, particularly for scenes with dynamic or complex backgrounds.

In one embodiment, an array of Adaptive Resonance Theory (ART) networks is used to generate a background model of the scene. For example, the background model may include a two-dimensional (2D) array of ART networks, where each pixel is modeled using one of the ART networks in the 2D array. When the background model is initiated, the 2D array of ART networks observes the image for regular (or periodic) patterns occurring in the pixel color values. As described in greater detail herein, an ART network may contain multiple clusters, each described by means and variances. The means and the variances for the clusters are updated in each successive video frame. In context of the present invention, each cluster in an ART network may represent a distinct background state for the corresponding pixel. Additionally, each cluster may be monitored for maturity. When a cluster in the ART network for pixel (x, y) has matured, it is used to classify that pixel as depicting either foreground or background; namely, if the RGB values for a pixel map to a mature cluster, then that pixel is presumed to depict scene background.

Thus, each ART network in the 2D array models one of the pixels over multiple frames of video by creating new clusters, modifying, merging, and removing clusters from the network, based on the pixel color values for that pixel observed over time. Classification is applied using choice tests and vigilance tests. The choice test measures the length between two points (learned point of cluster vs. test point) in the RGB space. The vigilance test measures the angle between two points in the RGB space. The similarity measure used for the vigilance test helps prevent the background model from classifying weak shadow as foreground. The creation of a new cluster may indicate either a valid change of a pixel or a noisy pixel. The modification of an existing cluster reinforces the significance/importance of a cluster. The merging of multiple clusters maintains the accuracy, stability, and scalability of the background model. The deletion of a cluster removes a weak belief of a new background/foreground state for the corresponding pixel.

For example, in a scene where a door is generally always open or closed, the door 'open' and 'closed' states could be considered as layers in the proposed background model and therefore be treated as background. Furthermore, noise in the scene may be modeled using multiple clusters in an ART and therefore be treated as background. Moreover, a random car driving through a camera's field of view will not result in a new background state because any clusters generated for a pixel depicting the car over a small number of frames is unstable and eventually deleted when not reinforced. Consequently, the proposed background model is adaptive to complex and dynamic environments in a manner that does not require any supervision; thus, it is suitable for long-term observation in a video surveillance application.

Once the background model for a scene has matured, the computer vision engine may compare the pixel values for a given frame with the background image and identify objects as they appear and move about the scene. Typically, when a region of pixels in the scene (referred to as a "blob" or "patch") is classified as depicting foreground, the patch itself is identified as a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames.

Data output from the computer vision engine may be supplied to the machine-learning engine. In one embodiment, the machine-learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," "vehicle turns," "vehicle slowing," and "vehicle stops" (once the kinematic information about the car indicated a speed of 0). As events occur, and re-occur, the machine-learning engine may create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest may result in alerts passed to users of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, classify the objects, derive a variety of metadata regarding the actions and interactions of such objects, and supply this information to a machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
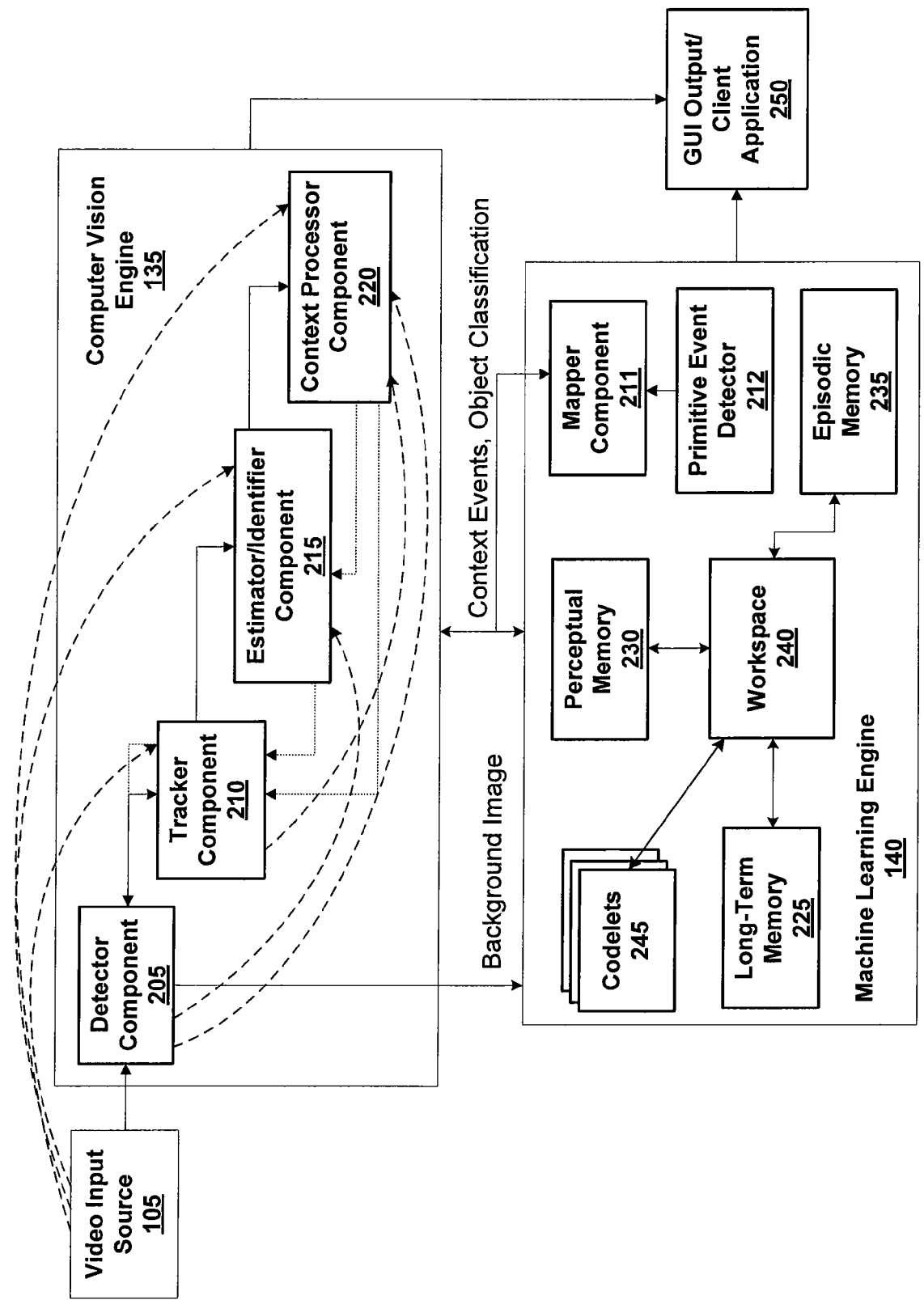
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the present invention. As shown, the computer vision engine 135 includes a detector component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the detector component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). As noted above, the detector component 205 may model the background states for each pixel using a corresponding ART network. That is, each pixel may be classified as depicting scene foreground or scene background using an ART network modeling a given pixel.

Additionally, the detector component 205 may be configured to generate a mask used to identify which pixels of the scene are classified as depicting foreground and, conversely, which pixels are classified as depicting scene background. The detector component 205 then identifies regions of the scene that contain a portion of scene foreground (referred to as a foreground "blob" or "patch") and supplies this information to subsequent stages of the pipeline. In one embodiment, a patch may be evaluated over a number of frames before being forwarded to other components of the computer vision engine 135. For example, the detector component 205 may evaluate features of a patch from frame-to-frame to make an initial determination that the patch depicts a foreground agent in the scene as opposed to simply a patch of pixels classified as foreground due to camera noise or changes in scene lighting. Additionally, pixels classified as depicting scene background maybe used to a background image modeling the scene.

The tracker component 210 may receive the foreground patches produced by the detector component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the detector component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. In an alternative embodiment, the machine learning engine 140 may classify foreground objects observed by the vision engine 135. For example, the machine-learning engine 140 may include an unsupervised classifier configured to observe and distinguish among different agent types (e.g., between people and vehicles) based on a plurality of micro-features (e.g., size, speed, appearance, etc.).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene," "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a binary ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

Foreground Object Detection

Figure 3:
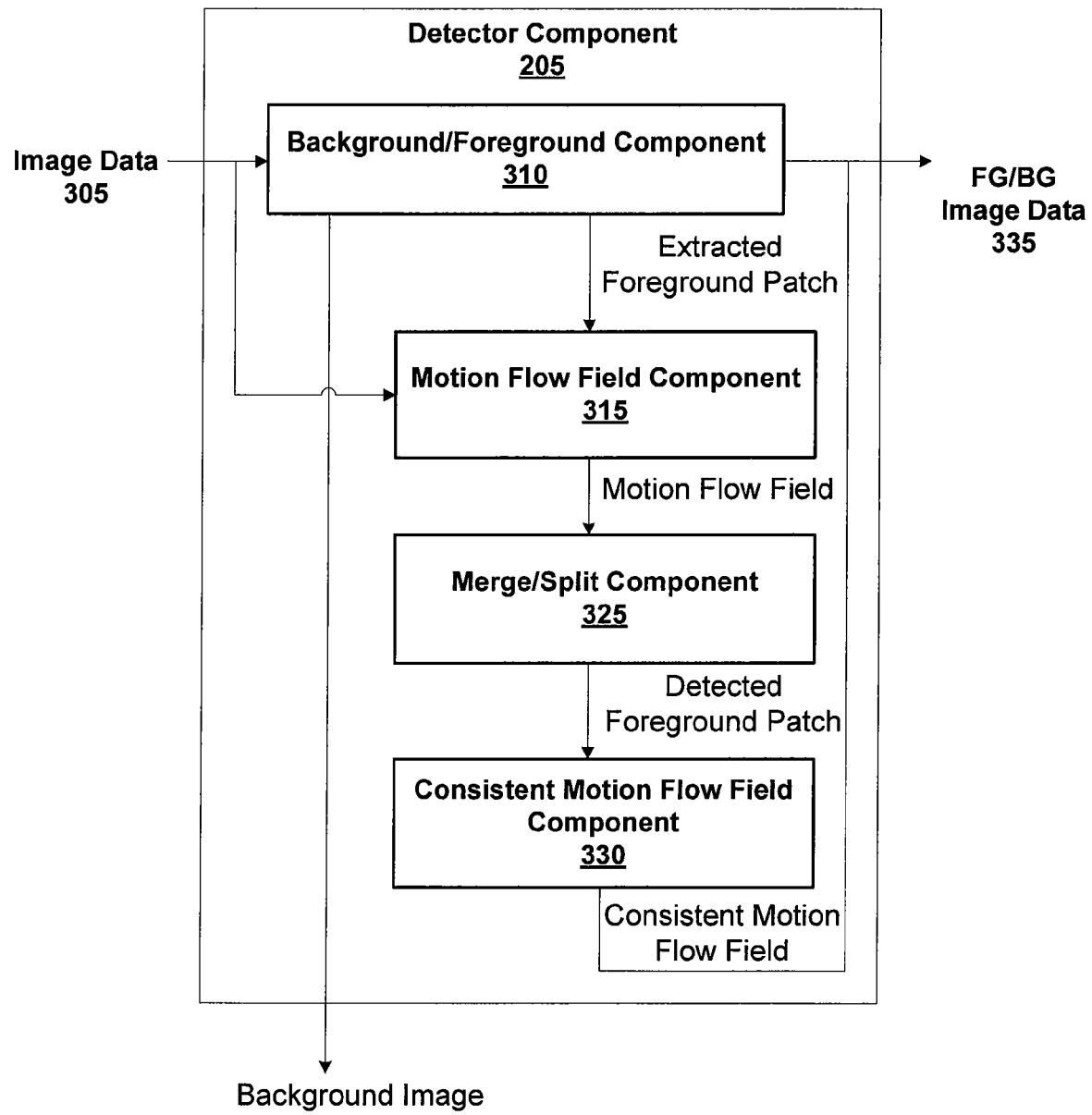
FIG. 3 illustrates an example of a detector component of the video analysis system shown in FIG. 2, according to one embodiment of the invention.

FIG. 3 illustrates an example of a detector component 205 of the computer vision engine 135 system shown in FIG. 2, according to one embodiment of the invention. As shown, the detector component 205 includes a background/foreground component 310, a motion flow field component 315, a merge/split component 325, and a consistent motion flow field component 330.

The background image output by the background/foreground component 310 generally provides an RGB (or grayscale) value for each pixel in a scene being observed by the computer vision engine 135. The RGB values in the background image specify a color value expected when the background of the scene is visible to the camera. That is, the color values observed in a frame of video when not occluded by a foreground object. The background/foreground component 310 may update the color values of pixels in the background image dynamically while the computer vision engine observes a sequence of video frames.

In one embodiment, the detector component 205 is configured to receive a current frame of video from an input source (e.g., a video camera) as image data 305. And in response, the background/foreground component 310 classifies each pixel in the frame as depicting scene background or scene foreground. For example, the RGB values for a given pixel may be passed to an input layer of a corresponding ART network in an ART network array. Each ART network in the array provides a specialized neural network configured to create clusters from a group of inputs (e.g., RGB pixel color values received from frame-to-frame). Each cluster in an ART network may be characterized by a mean and a variance from a prototype input representing that cluster (i.e., from an RGB value representing that cluster). The prototype is generated first, as a copy of the input vector used to create a new cluster (i.e., from the first set of RGB values used to create the new cluster). Subsequently, as new input RGB values are mapped to an existing cluster, the prototype RGB values (and the mean and variance for that cluster) may be updated using the input RGB values.

Additionally, the background/foreground component 310 may track how many input vectors (e.g., RGB pixel color values) map to a given cluster. Once a cluster has "matured" the background/foreground component 310 classifies a pixel mapping to that cluster as depicting scene background. In one embodiment, a cluster is "matured" once a minimum number of input RBG values have mapped to that cluster. Conversely, the background/foreground component 310 may classify pixels mapping to a cluster that has not matured (or pixels that result in a new cluster) as depicting an element of scene foreground.

For example, in context of the present invention, an ART network receives a vector storing the RGB color values of a pixel in a frame of image data 305. The particular ART network receives the RGB pixel color values for that same pixel from frame-to-frame. In response, the ART network may either update an existing cluster or create a new cluster, as determined using a choice and a vigilance test for the ART network. The choice and vigilance tests are used to evaluate the RGB input values passed to the ART network. The choice test may be used to rank the existing clusters, relative to the vector input RGB values. In one embodiment, the choice test may compute a Euclidian distance in RGB space between each cluster and the input RGB value, and the resulting distances can be ranked by magnitude (where smaller distances are ranked higher than greater distances). Once ranked, the vigilance test evaluates the existing clusters to determine whether to map the RGB input to one of the ranked clusters. In one embodiment, the vigilance test may compute a cosine angle between the two points (relative to a <0, 0, 0> origin of RGB space).

If no cluster is found to update using the RGB values supplied to the input layer (evaluated using the ranked clusters) then a new cluster is created. Subsequent input vectors that most closely resemble the new cluster (also as determined using the choice and vigilance tests) are then used to update that cluster. As is known, the vigilance parameter has considerable influence on an ART network; higher vigilance values produce more fine-grained clusters, while lower vigilance values result in fewer, more general clusters. In one embodiment, the ART networks may provide dynamic cluster sizes. For example, each cluster may be given an initial shape and size, such as a radius of 5-10. Each new input to a given ART network in array 315 is then used to update the size of a cluster for each dimension of input data (or create a new cluster).

Additionally, in one embodiment, the ART networks may also be configured to provide for cluster decay. For example, each ART network may be configured remove a cluster that has not been reinforced. In such a case, if a new cluster is created, but no new inputs (e.g., RGB values) map to that cluster for a specified period, then that ART network may simply remove the cluster. Doing so avoids transient elements (namely foreground objects which occlude the background) from being misclassified as scene background.

As clusters emerge in the ART networks, the background/foreground component 310 may evaluate the ART networks to classify each pixel in the input video frame as depicting scene foreground or scene background. Additionally, the background/foreground component 310 may be configured to update the background image using the RGB values of pixels classified as depicting scene background. For example, in one embodiment, the current background image may be updated using the input frame as follows. First, each pixel appearance value (e.g., RGB values) is mapped to the ART network corresponding to that pixel. If a given pixel maps to a cluster determined to model a background state, then that pixel is assigned a color value based on that cluster. Namely, each cluster has a mean which may be used to derive a set of RGB color values. In particular, the RGB values that would map directly to the mean value in the cluster.

For pixels in a frame of image data 305 with appearance values that do not map to a cluster classified as background, the mean for the closest cluster (determined using a Euclidian distance measure) may be used to select an RGB values. Alternatively, as the background elements in the scene may have been occluded by a foreground agent, the RGB values in the current background image may remain unchanged. For a scene with multiple background states, this latter approach leaves the background image in the last observed state. For example, consider a person standing in front of a closed elevator door. In such a case, the last observed pixel RGB values may correspond to the color of the closed elevator door. When the person (a foreground object) occludes the door (e.g., while waiting for the elevator doors to open) the occluded pixels retain the last observation (state) while other pixels in the frame mapping to background clusters in the art network are updated.

Once each pixel in the input frame is classified, the background/foreground component 310 may be configured to identify contiguous regions of pixels classified as foreground. Such regions identify a foreground patch that is included in FG/BG image data 335 and output to the motion flow field component 315 along with the image data 305. As noted, the background/foreground component 310 may evaluate a patch over a number of frames before forwarding a patch to other elements of the computer vision engine 135, e.g., to ensure that a given foreground patch is not the result of camera noise or changes in scene lighting. Additionally, the current background image may be provided to other components of the computer vision engine 135 or machine-learning 140, after being updated with each successive frame.

The foreground patches that are extracted by the background/foreground component 310 from the background model may be spurious and/or unreliable depending on the characteristic of the camera and/or the scene environment. Additionally, some of the foreground patches may be fragments of a single object and those foreground patches should be merged together for more efficient tracking. The motion flow field component 315, merge/split component 325, and consistent motion flow field component 330 are used to produce validated foreground patches by filtering out spurious foreground patches extracted by the background/foreground component 310 and reduce the tracking workload for tracker component 210. The detected foreground patches depict foreground objects that are tracked over time.

The motion flow field component 315 receives the image data 305 and computes the motion flow field for each frame using optical flow processing techniques. The motion flow field specifies vectors including an angle and magnitude for features in the frame. The features correspond to one or more foreground patches that exist in multiple frames in a sequence. The motion flow field that is computed for each frame by the motion flow field component 315 is output to the merge/split component 325. The difference in color or grayscale values for each pixel between two sequential frames is the motion history data. A single angle and magnitude may be computed for feature vectors that are included within an extracted foreground patch by averaging the angle and magnitude values or combining the angle and magnitude values using another function to produce a feature flow field.

The motion flow field component 315 outputs the motion flow field and the extracted foreground patches to the merge/split component 325 which merges and/or splits the extracted foreground patches to produce detected foreground patches. The merge/split component 325 may also discard spurious extracted foreground patches based on the motion flow field. An extracted foreground patch may be split into multiple foreground patches or merged with another extracted foreground patch, as described in conjunction with FIGS. 4A and 4B. One or more of the feature vectors in the motion flow field are associated with each detected foreground patch.

The consistent motion flow field component 330 receives the detected foreground patches and the motion flow field and produces the consistent motion flow field. A detected foreground patch is determined to be reliable (not spurious) by the merge/split component 325 when a consistent flow field is observed for the detected foreground patch over a predetermined number of sequential frames. Detected foreground patches and feature vectors that are not reliable are removed by the consistent motion flow field component 330. In some embodiments the predetermined number of sequential frames is 3. The motion flow field component 330 outputs the consistent motion flow field to the tracker component 210 as part of the FG/BG image data 335.

Figure 4A:
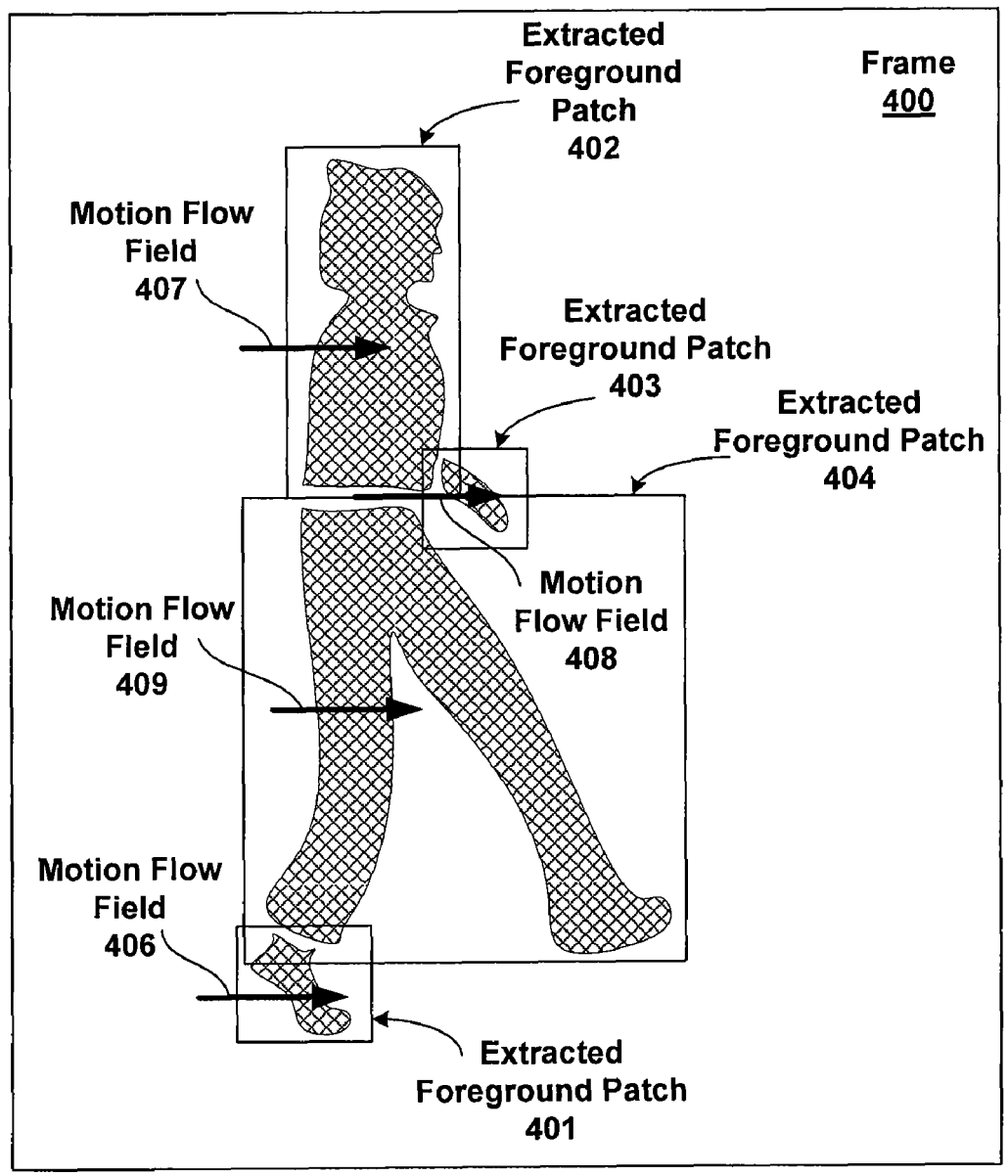
FIGS. 4A and 4B illustrate examples of a frame and motion flow fields, according to one embodiment of the invention.

FIG. 4A illustrates examples of frame and motion flow fields 406, 407, 408, and 409 for extracted foreground patches 401, 402, 403, and 404, respectively, in a frame 400, according to one embodiment of the invention. The merge/split component 325 joins extracted foreground patches that have been fragmented using the image data 305 to distinguish between the foreground and background color. Additionally, the merge/split component 325 joins extracted foreground patches that have similar direction and magnitude according to the feature flow field and are slow moving. As shown in FIG. 4A, the direction (angle) and magnitude of the motion flow fields 406, 407, 408, and 409 are similar. Therefore, extracted foreground patches 401, 402, 403, and 404 are merged by the merge/split component 325 to produce a single detected foreground patch.

Figure 4B:
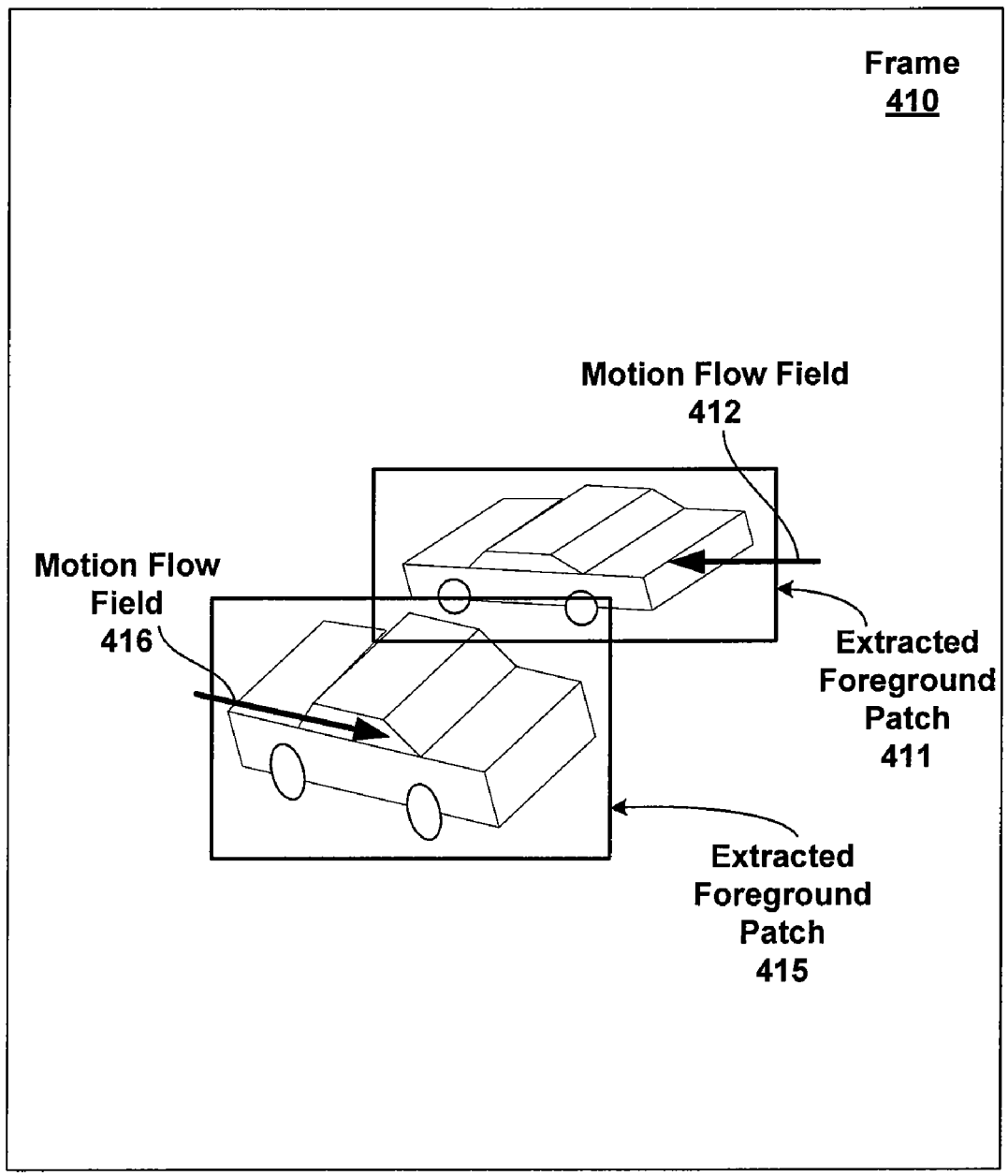

FIG. 4B illustrates examples of frame and motion flow fields for an extracted foreground patch that is split into two detected foreground patches, in a frame 410, according to one embodiment of the invention. The merge/split component 325 splits extracted foreground patches that include separate objects based on the motion flow fields. Specifically, a extracted foreground patch is split when the motion flow field for the extracted foreground patch includes flows in opposing directions. The extracted foreground patch may also be split based on flow fields that have different magnitudes and that indicate a fast moving object. As shown in FIG. 4B, the direction (angle) and magnitude of the motion flow fields 412 and 416 are opposing. Therefore, a extracted foreground patch is split into two different detected foreground patches 411 and 415 by the merge/split component 325.

Figure 4C:
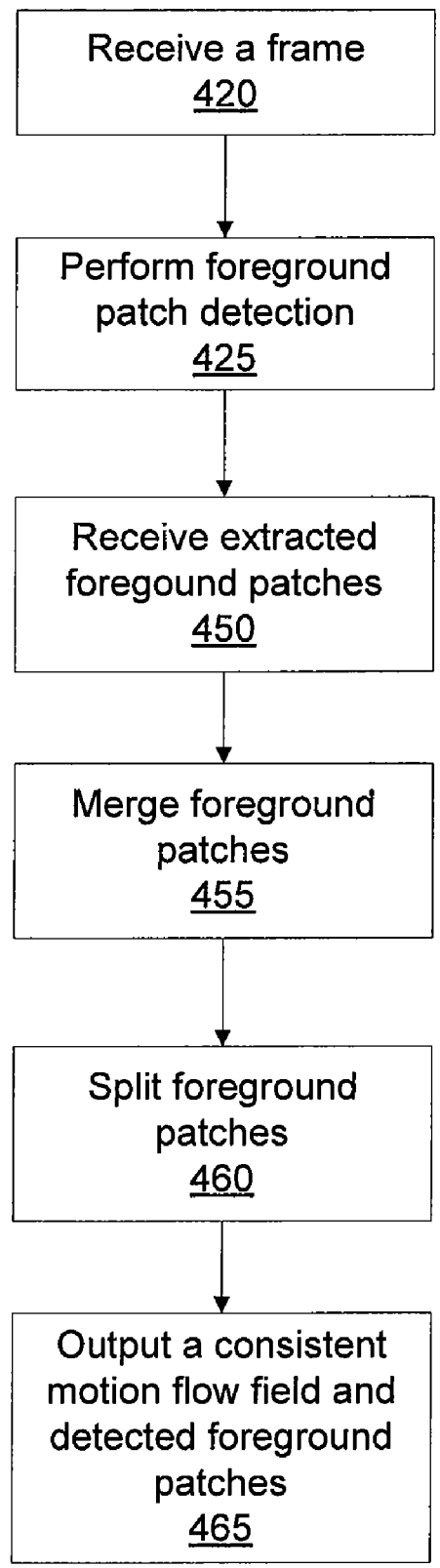
FIG. 4C illustrates a method for detecting foreground patches, according to one embodiment of the invention.

FIG. 4C illustrates a method for detecting foreground patches and producing a consistent motion flow field, according to one embodiment of the invention. At step 420 the detector component 205 receives the image data for a frame of video. At step 425 the motion flow field component 315 generates a motion flow field for the frame and performs foreground patch extraction to produce extracted foreground patches that depict foreground objects, as described in further detail in conjunction with FIG. 4D. At step 450 the merge/split component 325 receives the image data, extracted foreground patches, and motion flow field from the motion flow field component 315. At step 455 the merge/split component 325 merges any extracted foreground patches that have been fragmented. At step 460 the merge/split component 325 splits any extracted foreground patches that correspond to separate objects. At step 465 the detector component 205 outputs a consistent motion flow field that specifies the detected foreground patches and feature flow vectors following the merging and/or splitting of the extracted foreground patches.

Figure 4D:
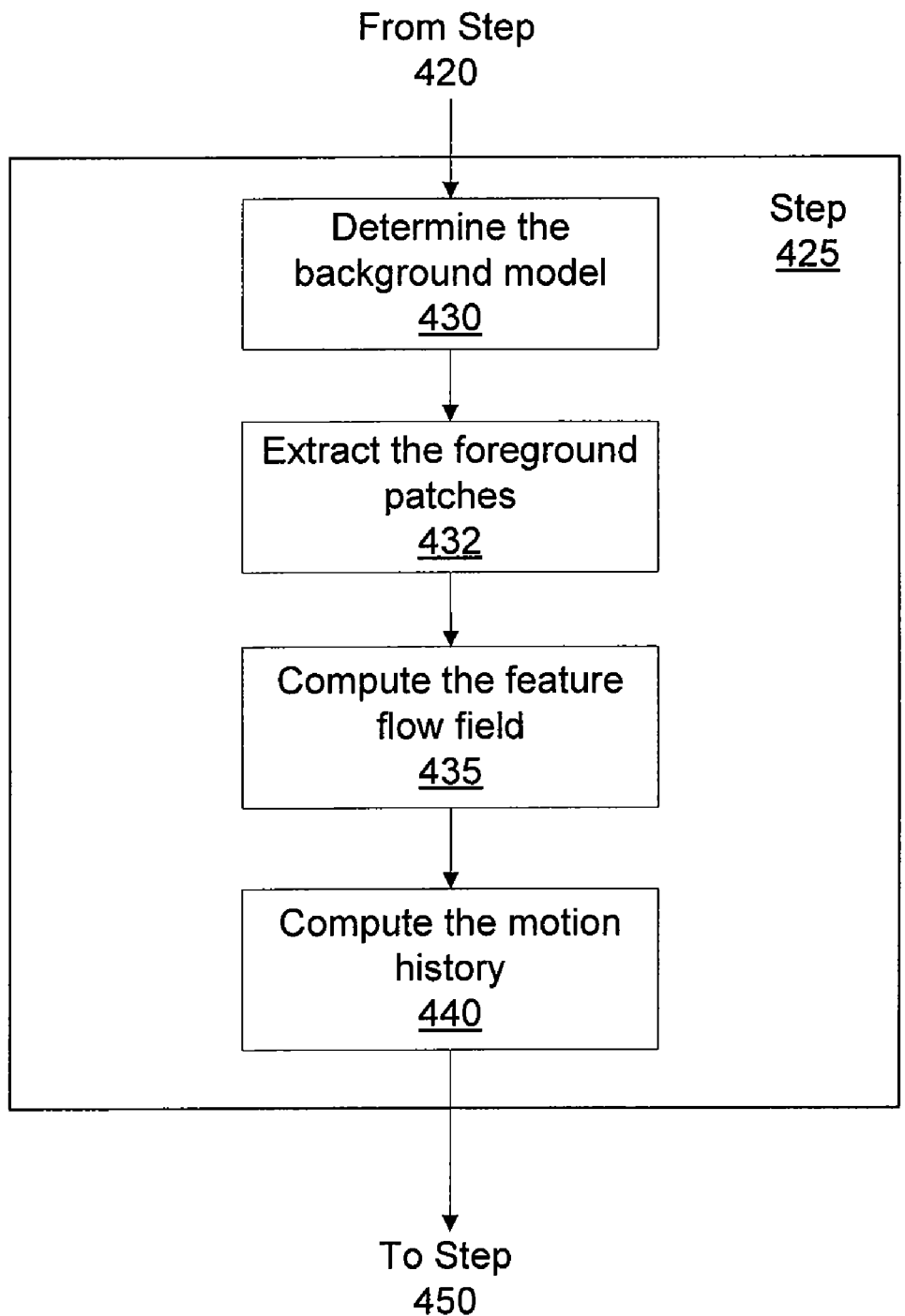
FIG. 4D illustrates a method for performing a step shown in FIG. 4C to produce detected foreground patches, according to one embodiment of the invention.

FIG. 4D illustrates a method for performing step 425 of FIG. 4C to produce detected foreground patches, according to one embodiment of the invention. At step 430 the background model is determined by the background/foreground component 310. At step 432 the background/foreground component 310 uses the background model to extract foreground patches from each frame of the image data 305.

The motion flow field component 315 receives the image data 305 and produces detected foreground patches. Steps 435, 440, and 442 are independent of steps 430 and 432 and may be performed in parallel with steps 430 and 432. At step 435 the motion flow field component 315 computes the feature flow field using the motion flow field. At step 550 the motion flow field component 315 computes the motion history data using the motion flow field. Steps 435 and 440 may be performed in parallel by the motion flow field component 315.

The detector component 205 filters the foreground patches to produce detected foreground patches using a motion flow field since some of the extracted foreground patches may be spurious and/or unreliable depending on the characteristic of the camera and/or the scene environment. During the filtering process some of the extracted foreground patches may be merged together and other extracted foreground patches may be split for more efficient tracking.

Foreground Object Tracking

Figure 5:
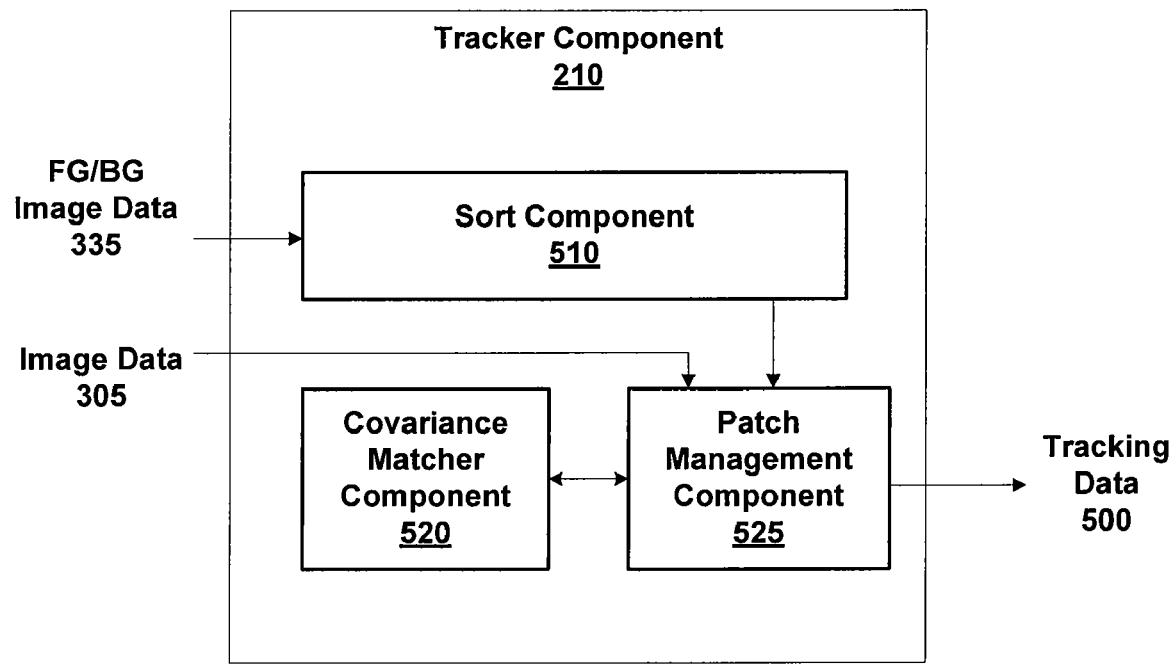
FIG. 5 illustrates an example of a tracker component of the video analysis system shown in FIG. 2, according to one embodiment of the invention.

FIG. 5 illustrates an example of the tracker component 210 of the computer vision engine 135 shown in FIG. 2, according to one embodiment of the invention. Reliable tracking is essential for any surveillance system to perform well and a tracker should provide reliable tracking data for the estimator/identifier component 215 to consume. Due to the heavy computational workload of tracking operations, a conventional tracker may not be able to provide reliable tracking data fast enough for a practical real-time surveillance system. In contrast with conventional trackers, the tracker component 210 uses a hybrid technique that relies on a combination of the motion flow field and covariance matrices to provide reliable tracking data with the performance needed for real-time surveillance.

The tracker component 210 includes a sort component 510, a patch management component 525, and a covariance matcher component 520. The tracker component 210 receives the FG/BG image data 335 that includes the detected foreground patches and the consistent motion flow field from the detector component 205 and produces reliable tracking data 500 that is output to the estimator/identifier component 215. The sort component 510 sorts the detected foreground patches (or detected rectangles) into discovered foreground patches and existing foreground patches. The discovered foreground patches do not correspond with any existing foreground patches that were present in previous frames. The discovered foreground patches are used during the processing of subsequent frames to differentiate between discovered and existing foreground patches. The existing foreground patches were present in previous frames.

The patch management component 525 receives the detected foreground patches and categorizes the detected foreground patches into one of several categories based on the consistent motion flow field and, if needed, the covariance matrices. The categories include N tracked foreground patch to one detected foreground patch (N to 1), one tracked foreground patch to K detected foreground patches (1 to K), one tracked foreground patch to one detected foreground patches (1 to 1), and one tracked foreground patch to zero detected foreground patch (1 to 0). The covariance matcher component 520 computes the covariance matrix for each frame as instructed by the patch management component 525. The covariance matrix is used by the patch management component 525 to resolve difficult detected foreground patches.

The covariance matcher component 520 uses a number of features of the image data 305 and solves the generalized Eigen solution to produce a covariance matrix that measures the features of a foreground patch. In most cases, three features, e.g., R, G, and B color components, are used to produce the covariance matrix. The covariance matrix is particularly useful for associating a detected foreground patch with a tracked foreground patch when the foreground object is not moving.

Figure 6A:
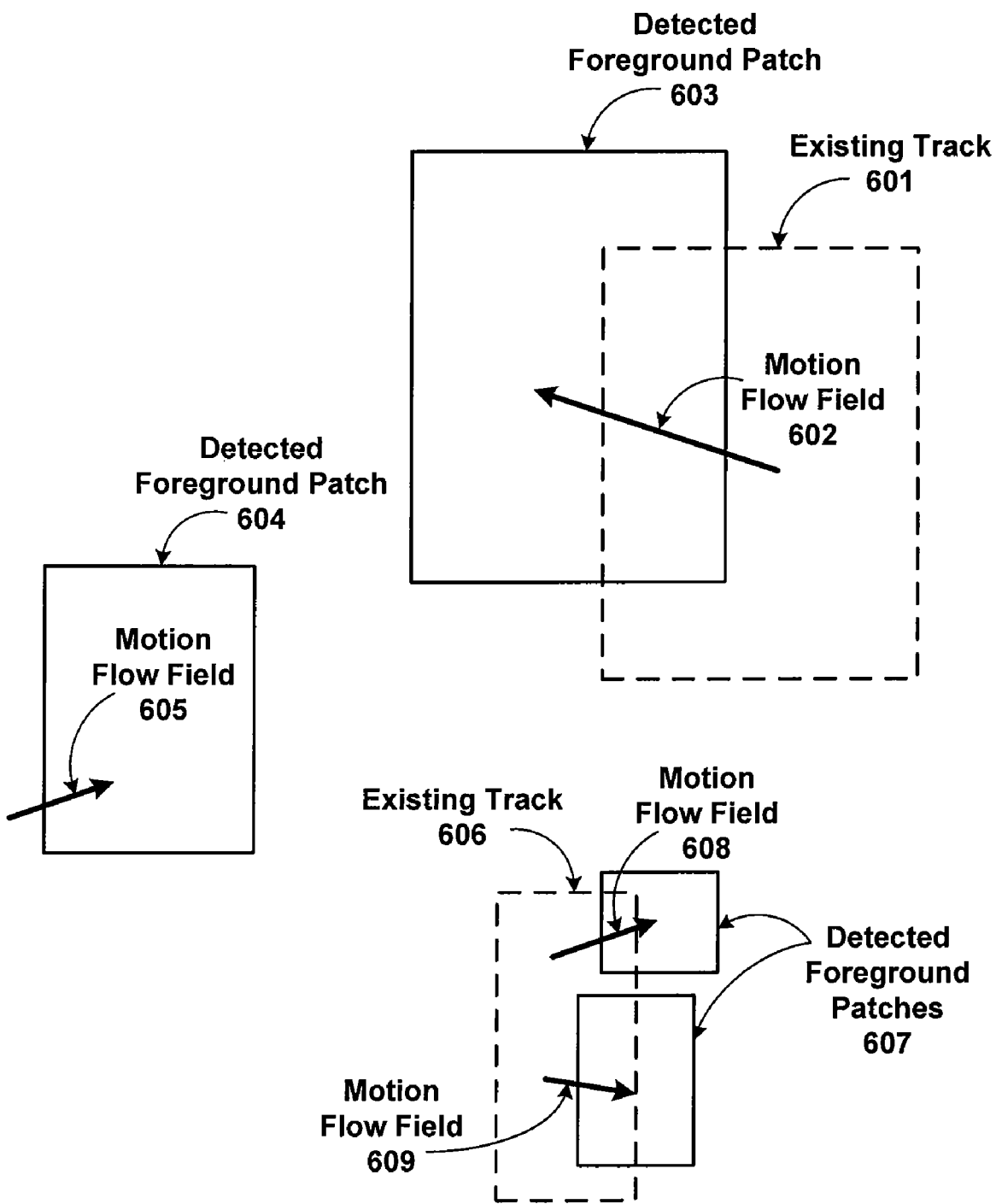
FIG. 6A illustrates examples of detected foreground patches and corresponding motion flow fields, according to one embodiment of the invention.

FIG. 6A illustrates examples of detected foreground patches 603, 604, and 607 and corresponding motion flow fields 602, 605, and 608 and 609, respectively, according to one embodiment of the invention. The detected foreground patch 603 is received by the sort component 510 and the motion flow field 602 is used to associate the detected foreground patch 603 with the existing track 601 since the motion flow field 602 points from the motion flow field 602 to the detected foreground patch 603. Detected foreground patch 603 is identified as an existing foreground patch and is associated with the existing track 601. In contrast, the motion flow field 605 that corresponds to the detected foreground patch 604 points from no existing track to the detected foreground patch 604. Detected foreground patch 604 is identified as a discovered foreground patch and added to the tracking data 500. The motion flow fields 608 and 609 are used by the sort component 510 to associate the detected foreground patches 607 with the existing track 606 since the motion flow fields 608 and 609 point from the existing track 606 to the detected foreground patches 607. Therefore, detected foreground patches 607 are identified as an existing foreground patch and are associated with the existing track 606.

Figure 6B:
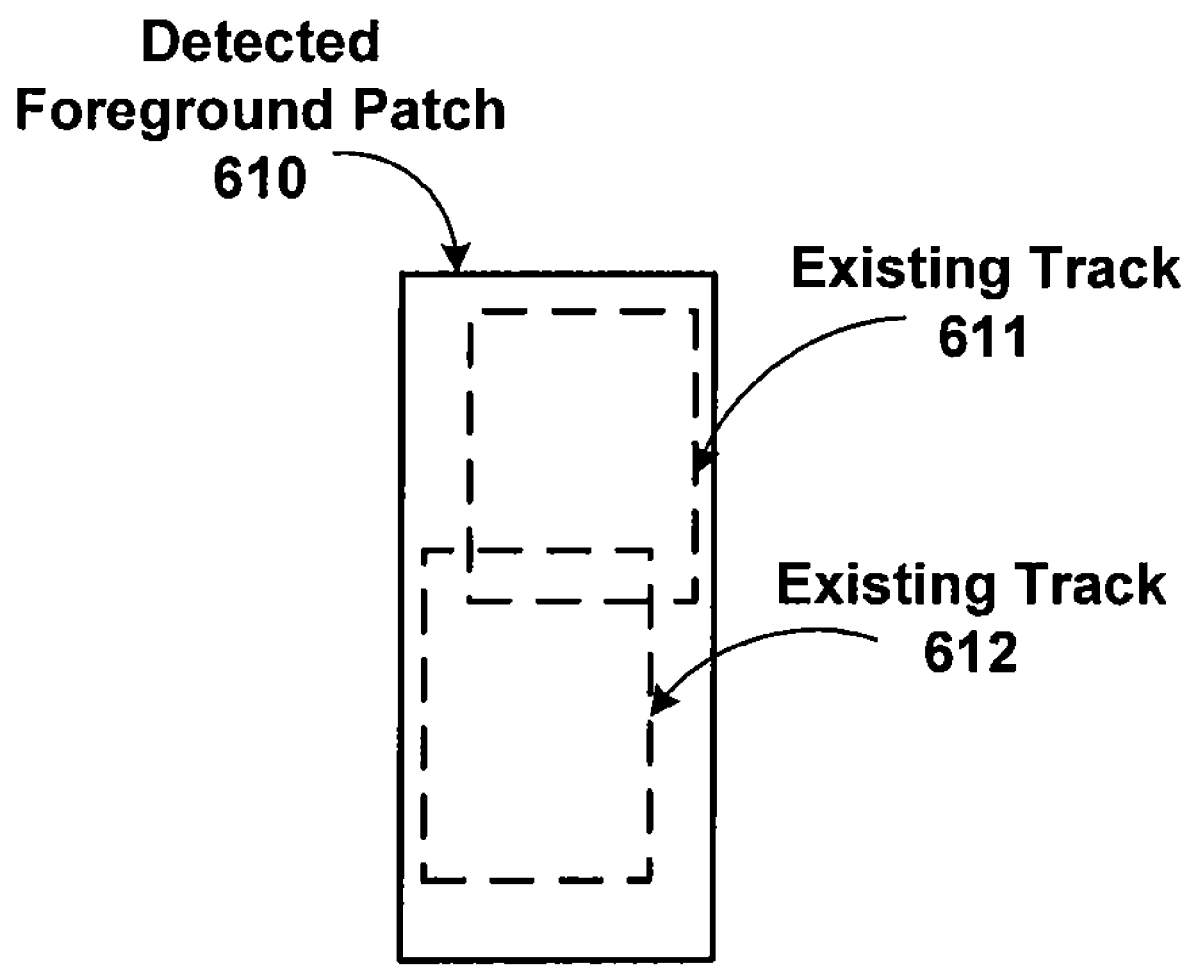
FIGS. 6B, 6C, and 6D illustrate examples of detected foreground patches and existing tracks, according to one embodiment of the invention.

FIG. 6B illustrates an example of the N tracked foreground patches to one detected foreground patch (N to 1) tracking category, according to one embodiment of the invention. Existing tracks 611 and 612 are the N=2 tracked foreground patches and the one detected foreground patch 610. The detected foreground patch 610 is associated with the two existing tracks 611 and 612 by the patch management component 525 using the motion flow field. The detected foreground patch 610 replaces both of the existing track 611 and 612. The tracking data 500 is updated by the patch management component 525 to include two tracked foreground patches with the same size and two different identifiers corresponding to the existing tracks 611 and 612.

Figure 6C:
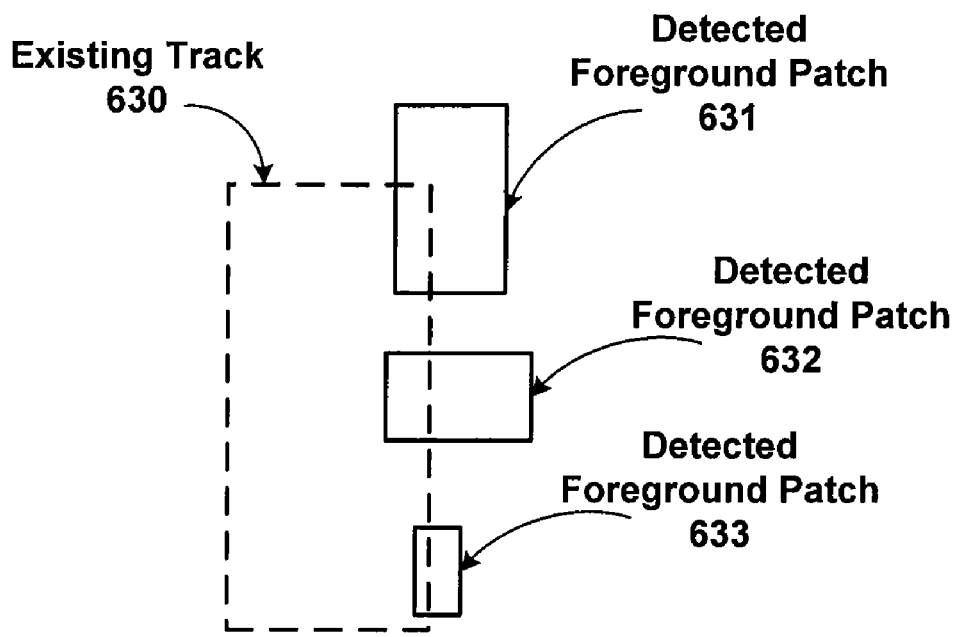
Figure 6D:
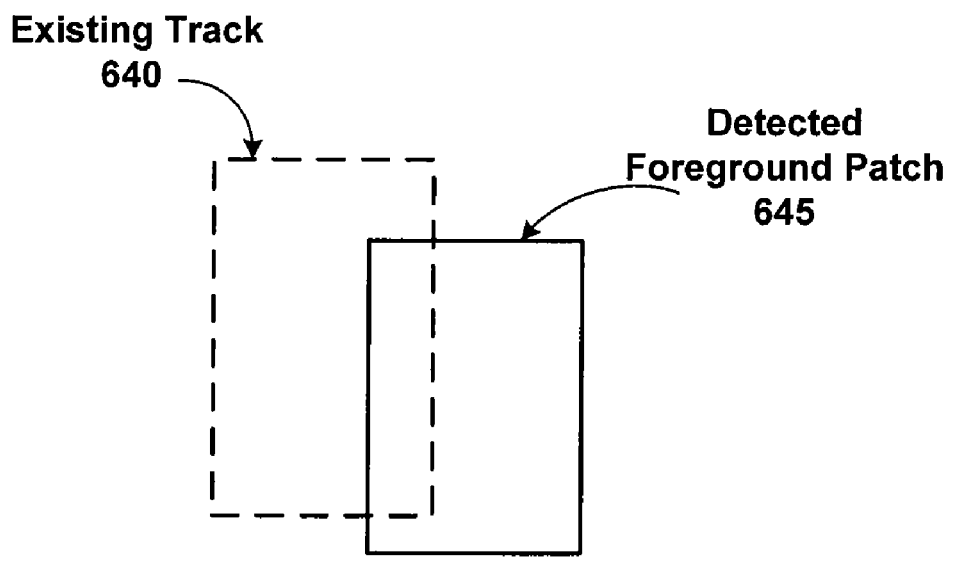

FIG. 6C illustrates an example of the 1 tracked foreground patches to one detected foreground patch (1 to K) tracking category, according to one embodiment of the invention. Existing track 630 is one tracked foreground patch and the detected foreground patches 631, 632, and 633 are the K=3 detected foreground patches. The patch management component 525 instructs the covariance matcher component 520 to compute the covariance matrix and determine whether or not detected foreground patches 631, 632, and 633 are associated with the existing track 630 since the motion flow field is not adequate. The detected foreground patches 631, 632, and 633 may replace the existing track 615 to update the tracking data 500.

FIG. 6E illustrates an example of the 1 tracked foreground patches to one detected foreground patch (1 to 1) tracking category, according to one embodiment of the invention. Existing track 640 is the one tracked foreground patch and the detected foreground patch 645 is the one detected foreground patch. The patch management component 525 determines if the size of the foreground patch corresponding to the existing track 640 is similar to the size of the detected foreground patch 645, and, if so, the detected foreground patch 645 is associated with the existing track 640. The size may be considered to be similar when the area of the detected foreground patch 645 is within 60% to 120% of the area of the foreground patch corresponding to the existing track 640. When the size is not similar, the patch management component 525 instructs the covariance matcher component 520 to compute the covariance matrix for the detected foreground patch 645 and determine whether or not the detected foreground patch 645 is associated with the existing track 645. The detected foreground patch 645 may replace the existing track 640 to update the tracking data 500.

When the patch management component 525 does not receive a detected foreground patch and there is one existing track, the 1 tracked foreground patch to zero detected foreground patch (1 to 0) tracking category is used. The motion history data may be used by the patch management component 525 to identify a stabilized stationary foreground object corresponding to the one tracked foreground patch. When there is not motion history data, the patch management component 525 instructs the covariance matcher component 520 to compute the covariance matrix for the frame to determine whether or not the foreground patch corresponding to the one tracked foreground patch exists. The tracking data 500 may be updated to remove a tracked foreground object that no longer exists in the scene.

Figure 7:
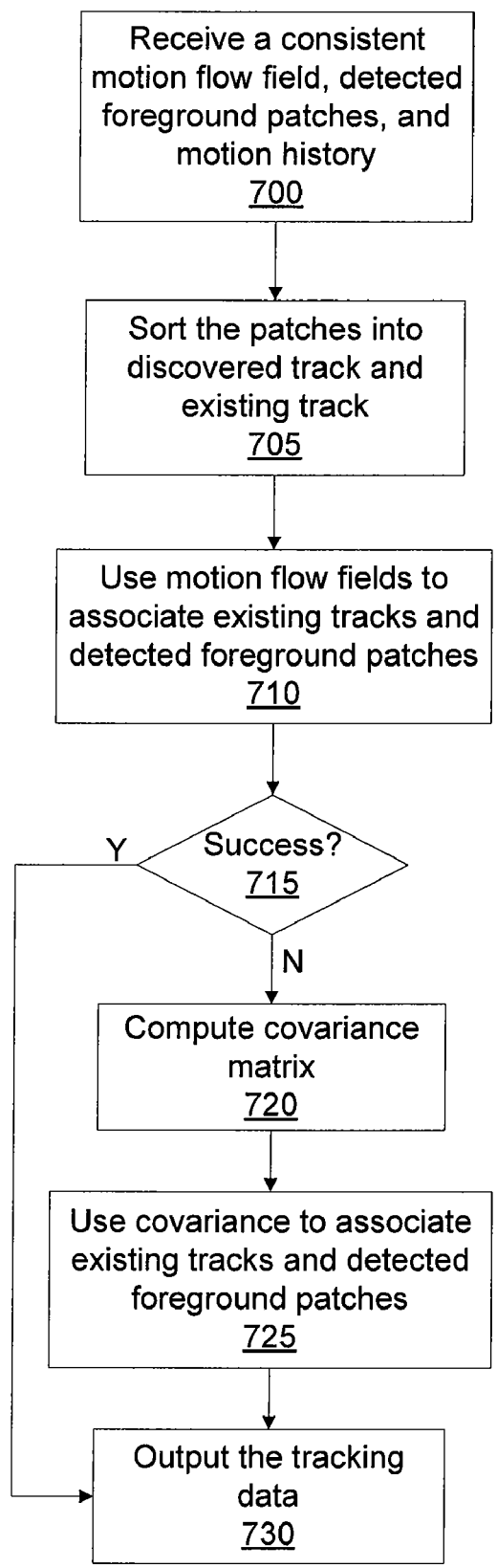
FIG. 7 illustrates a method for tracking detected foreground patches, according to one embodiment of the invention.

FIG. 7 illustrates a method for tracking detected foreground patches, according to one embodiment of the invention. At step 700 the tracker component 210 receives a consistent motion flow field that includes the detected foreground patches and the motion history data. The tracker component 210 also receives the image data 305. At step 705 the sort component 510 sorts the detected foreground patches into the discovered track and the existing track. At step 710 the patch management component 525 uses the motion flow field for a frame to categorize the detected foreground patches for the frame by associating the existing tracks and detected foreground patches and identifying any new foreground patches that will be tracked. If, at step 715 the patch management component 525 has successfully categorized all of the detected foreground patches, then at step 730 the patch management component 525 outputs the tracking data 500 with any updates. Otherwise, when the motion flow field does not provide enough information to successfully categorize the first detected foreground patch, at step 720 the patch management component 525 instructs the covariance matcher component 520 to compute the covariance matrix for the frame. At step 725 the covariance matcher component 520 uses the covariance matrix to associate the detected foreground patches with the existing tracks. The patch management component 525 may update the tracking data 500 to remove existing tracks for foreground patches that no longer exist or to add newly detected foreground patches that will be tracked. At step 730 the tracker component 210 outputs the updated tracking data 500.

The tracker component 210 uses a hybrid technique that relies on a combination of the motion flow field and covariance matrices to provide reliable tracking data with the performance needed for real-time surveillance. Reliable tracking is essential for any surveillance system to perform well, and the tracker component 210 provides reliable tracking data at a real-time performance level for processing by the estimator/identifier component 215.

While the foregoing is directed to embodiments of the present invention, other and further embodiments of the invention may be devised without departing from the basic scope thereof, and the scope thereof is determined by the claims that follow.

What is claimed is:

1. A computer-implemented method for tracking a detected foreground patch that depicts a foreground object in a sequence of video frames captured by a video camera, the method comprising:
    receiving a video frame in the sequence of video frame;
    detecting a foreground patch that depicts a foreground object in the video frame to produce a detected first foreground patch;
    receiving a motion flow field for the video frame that includes an angle and magnitude value for the first detected foreground patch in the video frame relative to the first detected foreground patch in a previous video frame;
    categorizing the first detected foreground patch as being associated with an existing tracked foreground patch or as a discovered foreground patch based on a combination of the motion flow field and features of the first detected foreground patch; and
    updating tracking data that is used to track the foreground object in the sequence of video frames.

2. The method of claim 1, further comprising computing a covariance matrix using the features of the first detected foreground patch when the motion flow field does not provide enough information to categorize the first detected foreground patch.

3. The method of claim 2, wherein the features include the red, green, and blue color components included in the video frame.

4. The method of claim 1, further comprising determining that a second detected foreground patch is a discovered foreground patch and is not associated with the existing tracked foreground patch.

5. The method of claim 4, wherein the updating comprises adding the second detected foreground patch to the tracking data.

6. The method of claim 1, wherein the categorizing of the first detected foreground patch associates the first detected foreground patch with the existing tracked foreground patch because the size of the first detected foreground patch and the existing tracked foreground patch is similar.

7. The method of claim 1, further comprising:
    determining that the existing tracked foreground patch no longer exists based on a motion flow field for an additional video frame; and
    removing the existing tracked foreground patch from the tracking data.

8. The method of claim 1, wherein the angle is an average of angles in the motion flow field for each pixel corresponding to the first foreground patch and the magnitude value is an average of magnitude values in the motion flow field for each pixel corresponding to the first foreground patch.

9. A non-transitory computer-readable storage medium containing a program, which when executed by a processor, performs an operation for tracking a detected foreground patch that depicts a foreground object in a sequence of video frames captured by a video camera, the operation comprising: receiving a video frame in the sequence of video frame; detecting a foreground patch that depicts a foreground object in the video frame to produce a detected first foreground patch; receiving a motion flow field for the video frame that includes an angle and magnitude value for the first detected foreground patch in the video frame relative to the first detected foreground patch in a previous video frame; categorizing the first detected foreground patch as being associated with an existing tracked foreground patch or as a discovered foreground patch based on a combination of the motion flow field and features of the first detected foreground patch; and updating tracking data that is used to track the foreground object in the sequence of video frames.

10. The computer-readable storage medium of claim 9, further comprising computing a covariance matrix using the features of the first detected foreground patch when the motion flow field does not provide enough information to categorize the first detected foreground patch.

11. The computer-readable storage medium of claim 9, further comprising determining that a second detected foreground patch is a discovered foreground patch and is not associated with the existing tracked foreground patch.

12. The computer-readable storage medium of claim 11, wherein the updating comprises adding the second detected foreground patch to the tracking data.

13. The computer-readable storage medium of claim 9, wherein the categorizing of the first detected foreground patch associates the first detected foreground patch with the existing tracked foreground patch because the size of the first detected foreground patch and the existing tracked foreground patch is similar.

14. The computer-readable storage medium of claim 9, further comprising:
determining that the existing tracked foreground patch no longer exists based on a motion flow field for an additional video frame; and
removing the existing tracked foreground patch from the tracking data.

15. The computer-readable storage medium of claim 9, wherein the angle is an average of angles in the motion flow field for each pixel corresponding to the first foreground patch and the magnitude value is an average of magnitude values in the motion flow field for each pixel corresponding to the first foreground patch.

16. A system, comprising:
a video input source configured to provide a sequence of video frames;
a processor; and a memory containing a program, which, when executed on the processor is configured to perform an operation for tracking a detected foreground patch that depicts a foreground object in the sequence of video frames, the operation comprising:
receiving a video frame in the sequence of video frame;
detecting a foreground patch that depicts a foreground object in the video frame to produce a detected first foreground patch;
receiving a motion flow field for the video frame that includes an angle and magnitude value for the first detected foreground patch in the video frame relative to the first detected foreground patch in a previous video frame;
categorizing the first detected foreground patch as being associated with an existing tracked foreground patch or as a discovered foreground patch based on a combination of the motion flow field and features of the first detected foreground patch; and
updating tracking data that is used to track the foreground object in the sequence of video frames.

17. The system of claim 16, further comprising computing a covariance matrix using the features of the first detected foreground patch when the motion flow field does not provide enough information to categorize the first detected foreground patch.

18. The system of claim 16, further comprising:
determining that a second detected foreground patch is a discovered foreground patch and is not associated with the existing tracked foreground patch; and
adding the second detected foreground patch to the tracking data.

19. The system of claim 16, wherein the categorizing of the first detected foreground patch associates the first detected foreground patch with the existing tracked foreground patch because the size of the first detected foreground patch and the existing tracked foreground patch is similar.

20. The system of claim 16, further comprising:
determining that the existing tracked foreground patch no longer exists based on a motion flow field for an additional video frame; and
removing the existing tracked foreground patch from the tracking data.

* * * * *